United States Patent [19]

Lorie et al.

[11] 4,435,758

[45] Mar. 6, 1984

[54] METHOD FOR CONDITIONAL BRANCH EXECUTION IN SIMD VECTOR PROCESSORS

[75] Inventors: Raymond A. Lorie; Hovey R. Strong, Jr., both of San Jose, Calif.

[73] Assignee: International Business Machines Corporation, Armonk, N.Y.

[21] Appl. No.: 407,842

[22] Filed: Aug. 13, 1982

Related U.S. Application Data

[63] Continuation-in-part of Ser. No. 129,148, Mar. 10, 1980, abandoned.

[51] Int. Cl.[3] ............................................. G06F 15/16
[52] U.S. Cl. ................................................... 364/200
[58] Field of Search .......................................... 364/200

[56] References Cited

U.S. PATENT DOCUMENTS

| | | | |
|---|---|---|---|
| 3,537,074 | 10/1970 | Stokes | 364/200 |
| 3,643,227 | 2/1972 | Smith | 364/200 |
| 4,025,901 | 5/1977 | Bachman | 364/200 |
| 4,047,161 | 9/1977 | Davis | 364/200 |
| 4,074,353 | 2/1978 | Woods | 364/200 |
| 4,101,960 | 7/1978 | Stokes | 364/200 |
| 4,181,934 | 1/1980 | Marenin | 364/200 |

OTHER PUBLICATIONS

Chen, T. C.; Hebalkur, P. G.; and Schkolnick, N. "Parallel Table Directed Translation" and Parallel List Transfer Using Vector Processing, *IBM Technical Disclosure Bulletin*, vol. 22, No. 6, (Nov. 1979), p. 2489-2492.

Stone, H. S., Ed., *Introduction to Computer Architecture*, Chicago, Science Research Associates, Inc., 1975, pp. 321-355.

Thurber, K. J., "Parallel Processor Architectures—Part 1: General Purpose Systems," *Computer Design* (Jan. 1979), pp. 321-355.

Thurber, K. J., "Parallel Processor Architectures—Part 2; Special Purpose Systems," *Computer Design* (Feb. 1979), pp. 103-114.

Peatman, J. B., *The Design of Digital Systems*, New York, McGraw-Hill Book Company, 1972, pp. 42-43.

*Primary Examiner*—James D. Thomas
*Assistant Examiner*—David L. Clark
*Attorney, Agent, or Firm*—R. Bruce Brodie

[57] ABSTRACT

Flow graph related program segments having cyclic paths therethrough are efficiently processed on a SIMD machine by priority ordering the segments, selectively inserting ELSE/JOIN instructions as steps prior to enforcing the ordering when the network of program segments is executed on a SIMD machine.

3 Claims, 12 Drawing Figures

(MODIFICATIONS TO STOKES U.S. PAT. 4,101,960)

(MODIFICATIONS TO STOKES U.S. PAT. 4,101,960)

INSERTION OF ELSE AND
JOIN IN BASIC BLOCK FLOWGRAPH

ENFORCED PRIORITY ORDER

INSTRUCTION EXECUTION CYCLE

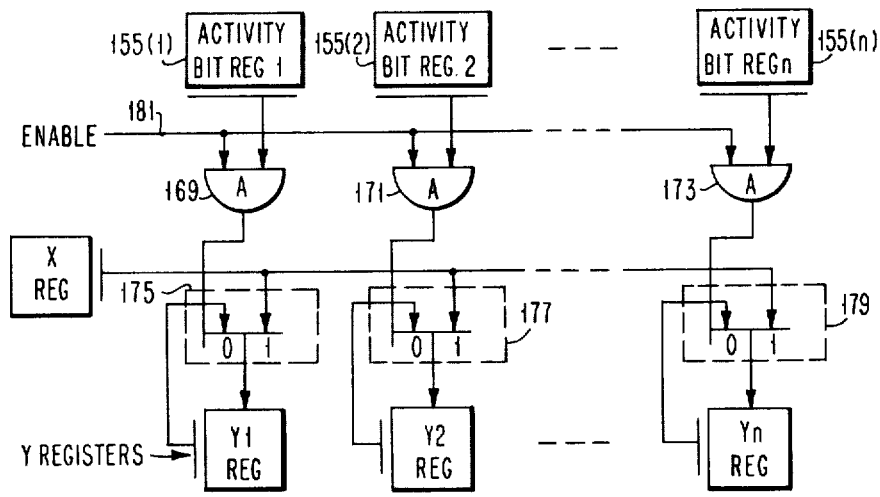
STEP 3: X = ARG, Y = ORDER ; AND X = OTGT, Y = IP
STEP 11: X = OTGT, Y = IP
STEP 12: X = ITGT, Y = IP
UPDATE ACTIVE Y REGS FROM X
FIG.6
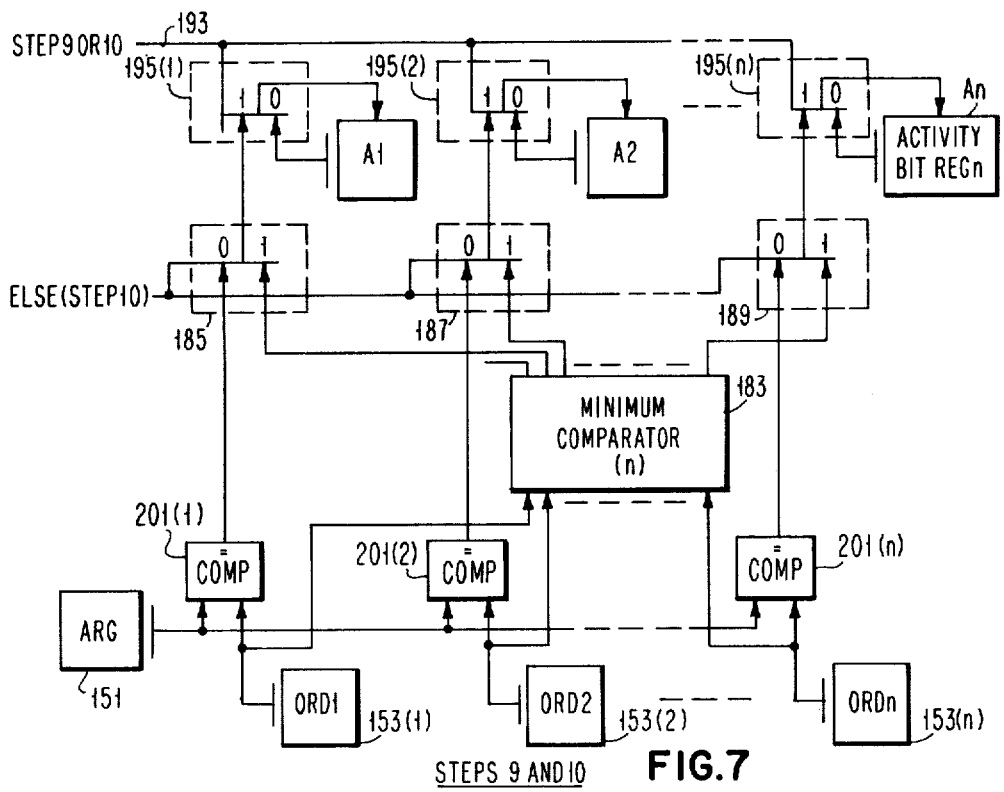
STEPS 9 AND 10  FIG.7

STEPS 5, 8, AND 13

METHOD FOR CONDITIONAL BRANCH EXECUTION IN SIMD VECTOR PROCESSORS

CROSS REFERENCE TO OTHER APPLICATION

This application is a continuation-in-part of application Ser. No. 129,148, filed March 10, 1980, now abandoned.

TECHNICAL FIELD

This invention relates to methods and means for controlling a single instruction-multiple data stream (SIMD) machine executing linearly ordered program sequences. More particularly, the invention relates to facilitating the execution of conditional branching instructions on machines of this type.

BACKGROUND

In many business data processing applications, a general purpose CPU is expected to handle a high volume of relatively short and relative homogeneous tasks or transactions. Often there is a high degree of potential parallelism between these tasks, both in the sense that they can be performed independently without interference and in the sense that for a large part of the time they perform exactly the same streams of instructions. One approach towards increasing throughput for these applications is to distribute the tasks to a number of processors. If the tasks are highly independent and contention-free, then some sort of network of independent asynchronous processors is suggested. However, if as in many data base applications, there is a high degree of contention for resources but the transactions are extremely homogeneous, then a network of synchronous processors working in an SIMD (single instruction multiple data) mode may be indicated. Groups of similar tasks may then be batched and run together through such a processor, synchronization minimizing the interprocessor communication is necessary in order to manage the resource contention. If the task consists of streams of straight line code (no branches), then all that is needed is a special purpose operating system for grouping, loading relevant data, starting and stopping.

When the tasks are general programs written for general purpose machines, they must be rewritten and broken down into straight line blocks. In such an event, a more complex scheduling is required.

SIMD parallel processors include a programmable control unit; a plurality of registers for storing counterpart vectors; mask registers; and means responsive to a sequence of one or more control unit instructions for concurrently operating upon data in the registers. Such machines may also be described as consisting of a programmable control unit driving an array of n parallel processors; each processor having a memory, arithmetic unit, program decode, and input/output (I/O) portions thereof. Such an array computer is described in Stokes et al, U.S. Pat. No. 3,537,074, issued Oct. 27, 1970.

Examples of data processing performable on such machines is described in IBM Technical Disclosure Bulletin Vol. 22, No. 6, pages 2489-2492, November 1979. These include parallel table-directed translations and the performance of selected vector operations on elements determined by masks associated with the modification of linked lists. Other applications, such as numerical weather prediction, lend themselves to the matrix-oriented processing available on such machines.

In SIMD machines, each linearly ordered program sequence, is called a basic block. More rigorously, each basic block consists of a maximal set of contiguous instructions uninterrupted by branches and targets except at its end points. Relatedly, the flow of control of these basic blocks may be modeled as a directed binary flowgraph. Unlike the processing of array data with its powerful matrix mathematics menu, the processing of conditional branching instructions is awkward. This derives from the delays imposed by the serialization of control as compared with the simultaneity of processing of data.

Presently, conditional branches cannot be supported on an SIMD machine except by the scheduling of the execution of basic blocks and managing masks controlling active and inactive parallel processors. In this respect, reference should be made to Stone et al, "Introduction to Computer Architecture", SRA Research Associates, Inc., 1975, at pages 333-338. Stone discusses masking for conditional branching in an SIMD machine. What he actually describes is the processing of high-level instruction sequences by an external CPU. The CPU selectively sends individual fragments to a control unit and an array processor for execution.

An example of a front-end processor coupling an array of processors over a distinctive I/O channel may be found in an IBM System 370 attaching an IBM 3838. This is described in IBM publication GA24-3639-1-, second edition, published in February 1977. Of interest is the fact that the 3838 array processor has twenty-one logic and index instructions but does not include a conditional branch or jump instruction.

THE INVENTION

It is an object of this invention to devise a method for scheduling the execution of instructions on processor subsets in order to maximize parallelism. It is a related object of this invention to devise a method for optimally scheduling an SIMD machine so that, upon program execution, time is minimized.

It is yet another object of this invention to devise a method and means for scheduling and executing conditional branching operations with respect to the processing of basic blocks on an SIMD machine. That is, the blocks should be executable on an SIMD machine of the type which includes an addressable memory for registration of machine status and conditions, and further, in which at least some of the basic blocks in the instruction stream have been priority ordered. Such machine should include activity masks to register and control the execution status of each of the array of processors.

The foregoing objects are satisfied by a machine implementable method, the steps of which may be partitioned into two groups. Those steps for formatting an instruction stream, which formatting consists of compile and postcompile time activities processed on any single instruction-single data stream (SISD) machine, and control steps applying the formatted streams to a SIMD machine. The formatting steps include conversion of a program into executable single entrance-single exit (SESE) flow graph-related programming segments, priority ordering of the segments, and selective insertion of ELSE or JOIN instructions. The control steps comprise applying the formatted streams to the parallel processors of the SIMD machine, designating the next or target segment for execution, executing the branch and enforcing the priority ordering by executing ELSE and JOIN instructions when encountered.

The selective insertion of instructions from the set consisting of ELSE X, JOIN X, and DATUM X at the beginning of predetermined ones of the basic blocks (the argument X represents the priority order of the block) renders enforceable priority ordering in the execution of the blocks. Upon the formatted stream being applied to the parallel processes of the SIMD machine and upon the occurrence of an inactive processor pointing to a basic block of an order less than the order of the basic block currently being executed. The second step consists of altering the activity mask so as to cause control to move to the basic block of lower order.

The execution of JOIN causes all processors waiting for the current block execution to be activated. In contrast, execution of ELSE results in the change of the current block order to be the minimum of the vector of block order registers.

Priority ordering involves the assignment of a unique number to each basic block so that the basic blocks are linearly ordered. Further, the ordering is such that a vector processor, whenever it has a choice of the next basic block to execute, always selects the lower ordered one. One procedure for priority ordering involves selecting a left/right ordering of the out edges for each conditional branch node. This is accomplished by the association of "left" with unsuccessful branches and "right" with successful branches.

The formatting assumes the blocks to be in a flow-graph (directed graph) relation. It includes the substeps of (1) inserting a JOIN instruction at the beginning of each target of a left branch, (2) inserting an ELSE instruction at the beginning of the target of any right branch for which the corresponding left branch target has a lower order, and (3) inserting an ELSE instruction at the beginning of the target node of which each edge satisfies the following two conditions (a) the interval defined by consecutive blocks (i, j) contains a JOIN or ELSE and (b) either the interval is not a left branch or the interval is incomplete or unprotected.

It is to be appreciated that the optimal scheduling of an SIMD machine means that there exists a set of processors synchronized at the instruction level so that only one instruction may be executed at a time. It further means that the instruction may be executed by all or any subset of the set of processors. Each processor is assumed to be executing the same instruction stream. However, since each processor is operating on different data, each may take a different path through the flow-graph related basic blocks constituting the stream. Scheduling involves deciding at each point in time which instruction is next to be executed without knowledge of the future path through the flowgraph that each processor will take.

Various other objects, advantages, and features of this invention will become more fully apparent in the following specification with its appended claims and accompanying drawings.

BREIF DESCRIPTION OF THE DRAWINGS

FIG. 1 is a block diagram depicting an SIMD processor according to Stokes, U.S. Pat. No. 4,101,960, with an indicated additional register plurality and control according to the invention.

Figure 5:
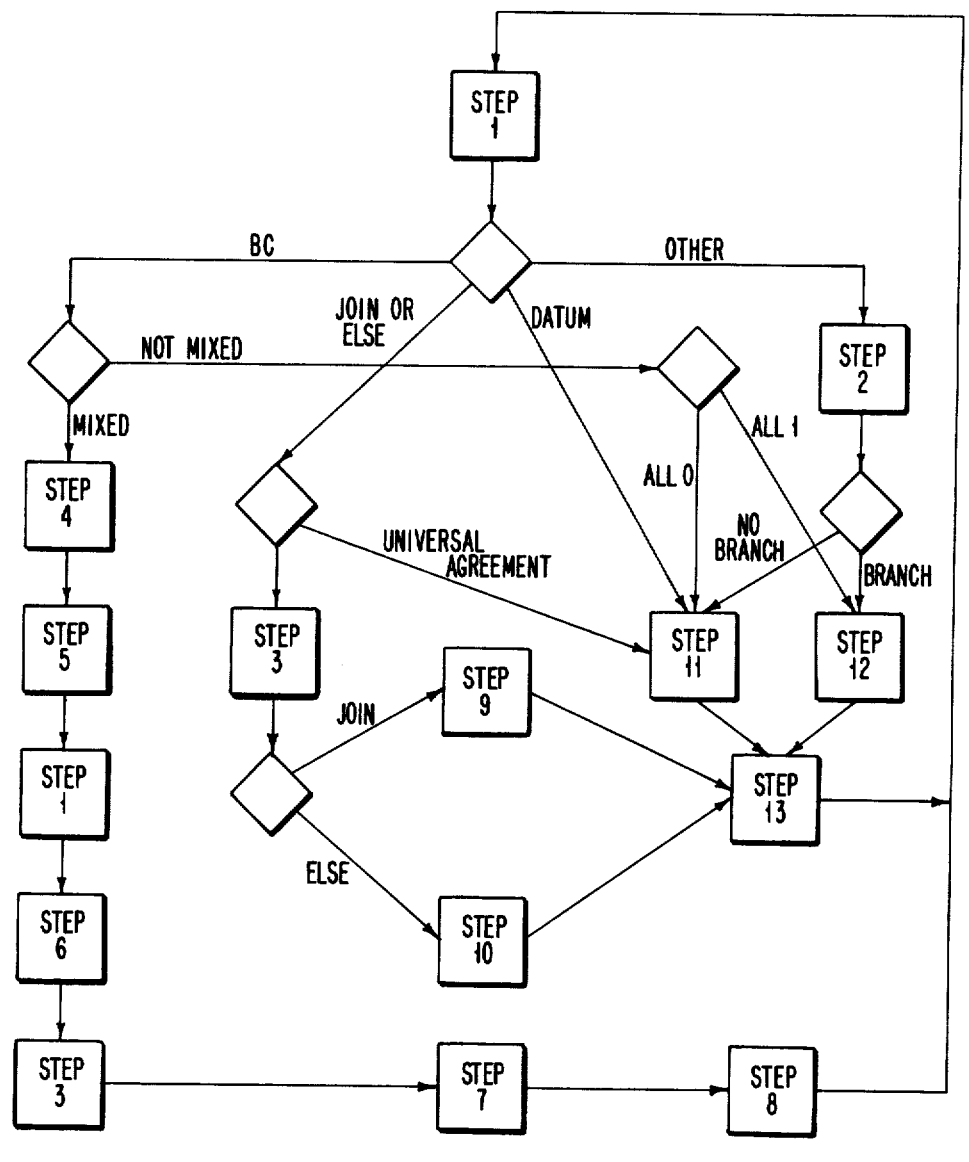

FIG. 5 sets forth the instruction execution cycle involving selective altering of the activity masks.

Figure 8:
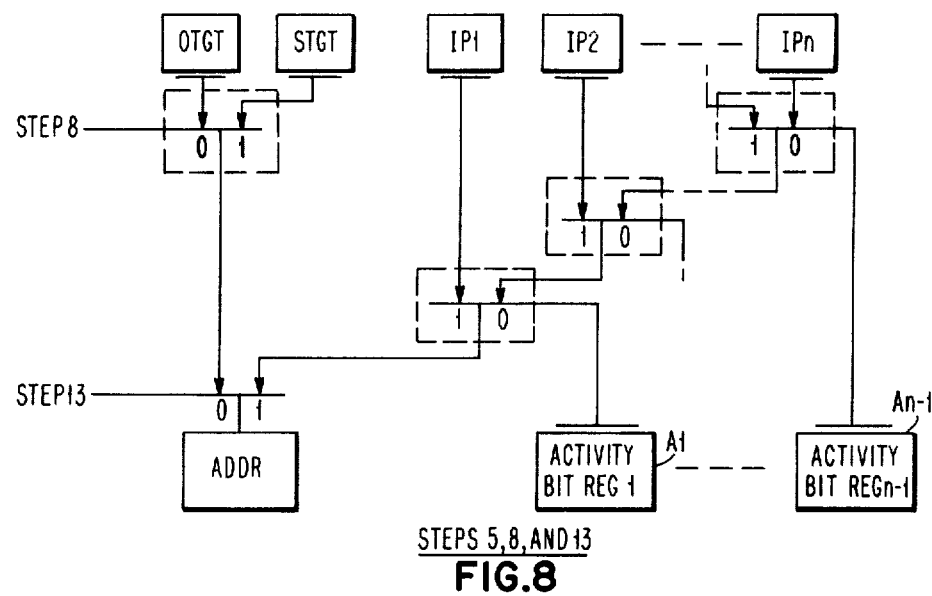

FIGS. 6, 7 and 8 show apparatus for implementing register modification and status.

Figure 9:
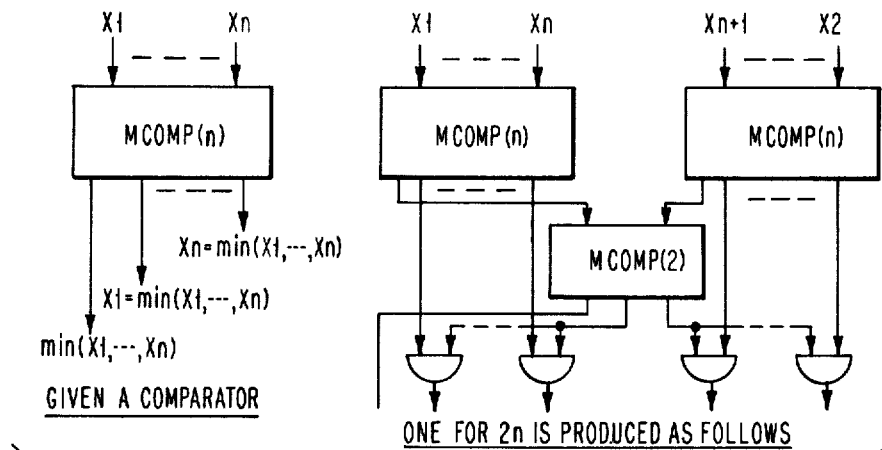
Figure 10:
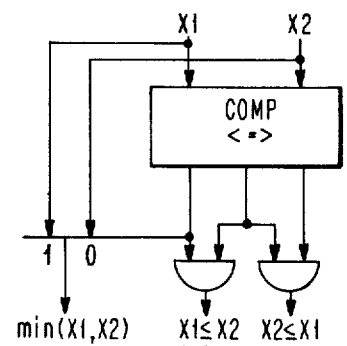

FIGS. 9 and 10 set out comparator circuit arrangements required for enforcing priority ordering.

Figure 11:
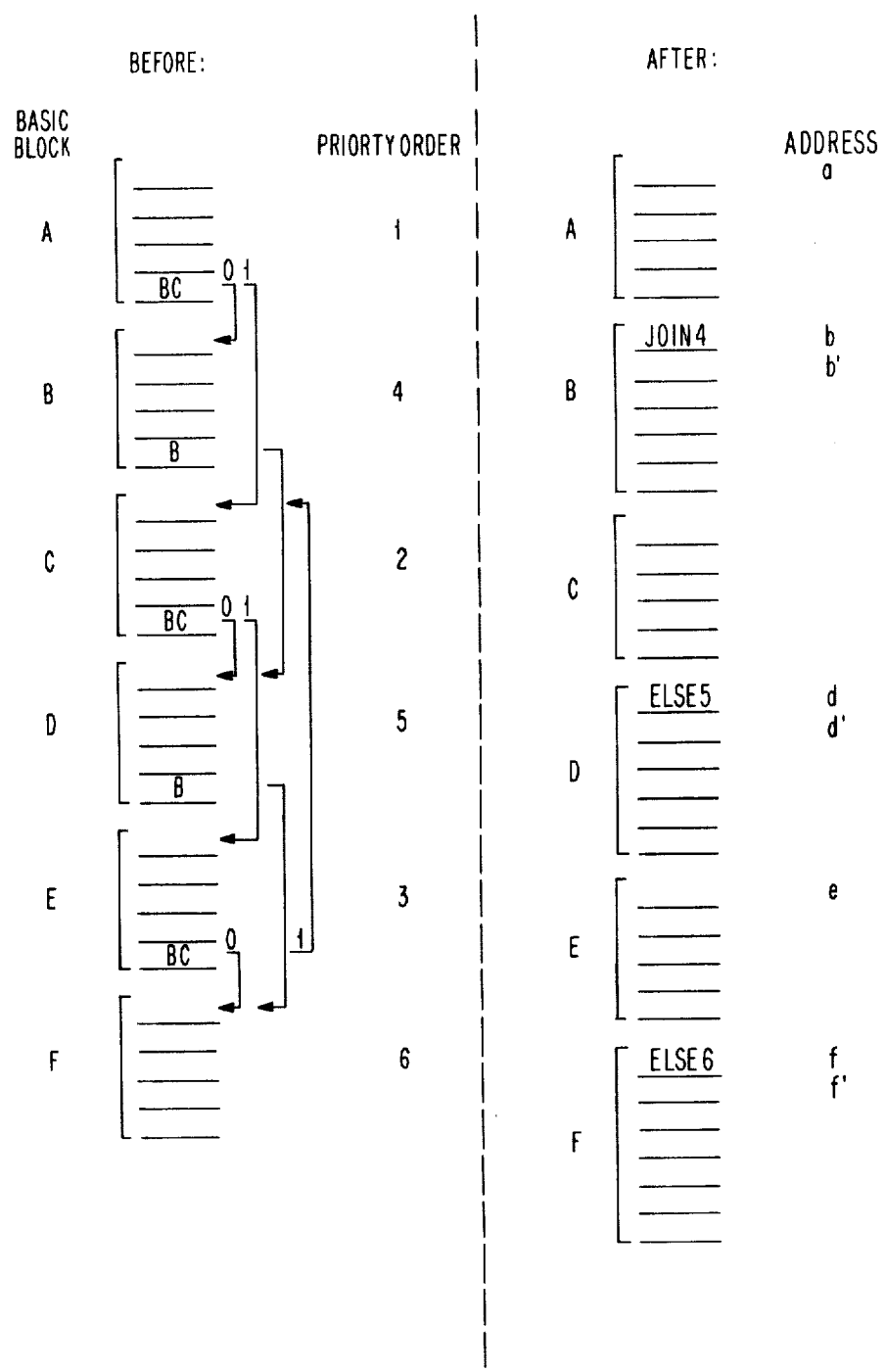

FIG. 11 depicts an execution sequence of basic blocks of varying priority order before and after scheduling by way of ELSE and JOIN insertion.

Figure 12:
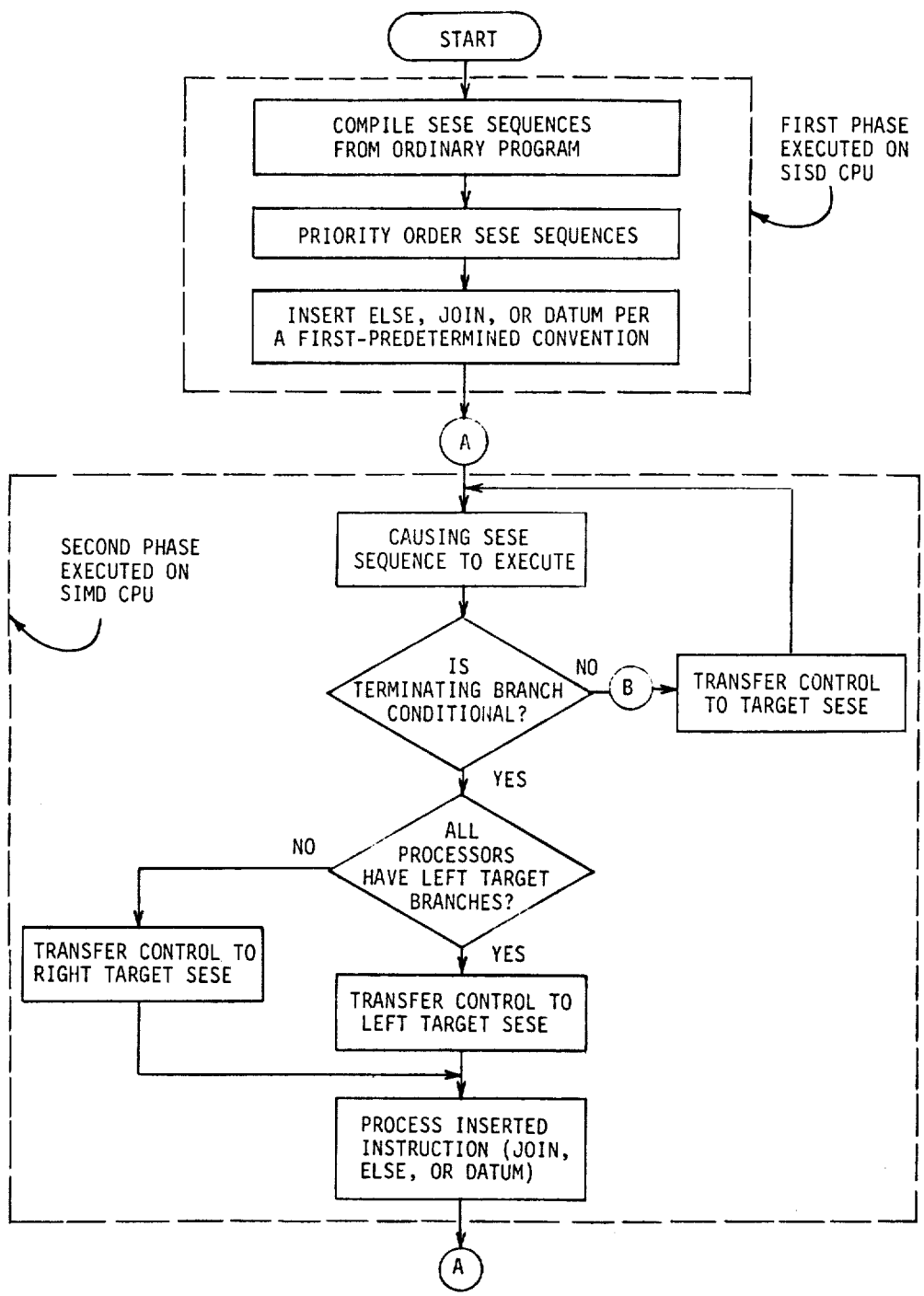

FIG. 12 shows a flow of control for the first phase steps on an SISD CPU and the second phase steps on an SIMD CPU.

DESCRIPTION OF THE BEST MODE and INDUSTRIAL APPLICABILITY

Flow Graphs, Control Flow, Priority Ordering and Enforcement on SIMD Machines Code currently executable on SIMD machines consists of blocks or program segments of straight line code. This means that there are no branches into or out of the block or segment, except at either the beginning or the end. These are referred to in the art as single entrance-single exit segments (SESE). At the end of the segment or block there can be, in the illustrative embodiment, up to at most a two-way branch. This factor is not believed to be a critical limitation to the invention.

The flow of control among these blocks is governed by execution of the branch. Each of the active processors is executing a program segment against a different data stream. Thus, at the conclusion of the execution of any given program segment, the active processors may all branch to the same next target segment, or in the case of the conditional branch, to those permissible choices dictated by executing against the local data stream. The segments are said to be flow graph related. This term merely epitomizes the fact that there exists a flow of control among segments as dictated by their conditional or unconditional branches terminating the segments.

Trees, Cycles and Processing

Figure 2:
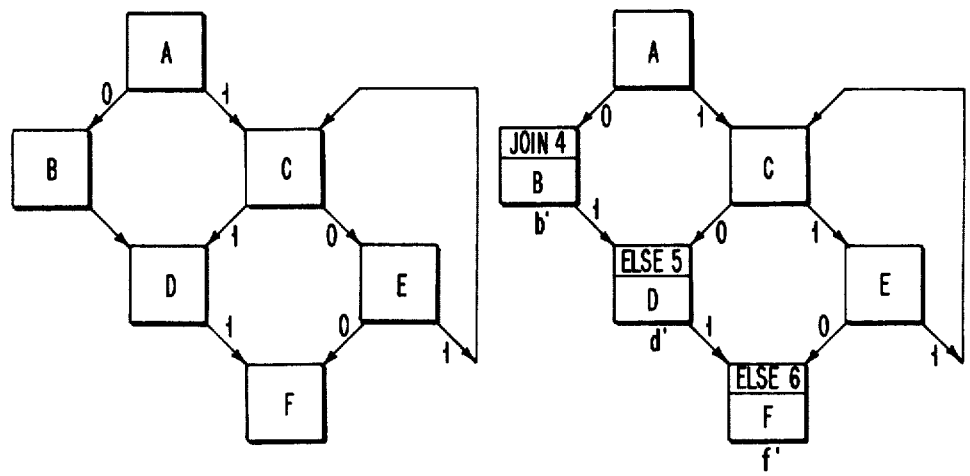
FIG. 2 illustrates the defining characteristics of basic blocks and flowgraphs at FIG. 11, including one method for insertion of ELSE and JOIN.

If the flow graph is in the form of a tree, then the scheduling of the next segment to be executed in an SIMD machine is the same as that in an SISD machine. That is, some jobs are done later than others. However, if the flow graph has cycles as shown in FIG. 2, other concerns are involved. When cycles occur selected segments can be repeatedly executed a different number of times upon different data streams in the SIMD. Significantly, this cyclic behavior is a function of the data stream driving the branching behavior and consequently the flow of control. Now, if only one data stream at a time were to be processed, then a SIMD machine collapses down to a SISD machine.

Priority Ordering

The invention superimposes upon this network of segments a priority ordering. As mentioned, priority ordering is the assignment of a segment label number in linear relation to previously assigned numbers. The label numbers collectively constitute an ordering based upon a depth first convention applied to the flow graph.

It is the object of the priority ordering to ensure maximum performance of a SIMD machine. By this is meant that as many processors as is possible will be active. Consequently, the throughput should be substantially more than that which an arbitrary ordering could secure.

SIMD Priority Ordering Enforcement

A priority ordering does not enforce itself upon a SIMD machine. In this invention, a condition sufficient for enforcing the priority ordering can be achieved by placing an ELSE instruction prior to each segment. It is by selective insertion of an ELSE or JOIN instruction that a minimal number of mask and branch type instructions need be used to bring about the ordering when the network segments are executed. Parenthetically, an ELSE instruction compares the order numbers of all segments or blocks next awaiting execution by the processors and turns "on" the activity mask only of those processing elements whose next segment has a minimum order number. Restated, the ELSE instruction is a "mask and branch" type instruction which turns the activity mask on for all processors waiting to execute the segment having minimal order.

SIMD Processing and Branching

The processing dynamics of a SIMD machine involves multiple processors executing the same program segments in block step and finishing at the same time. Any given segment which terminates with a branch to the next (target) segment presents a choice conditioned by the segment and processor operating on the data stream interacting at any given processor. This is resolved by adopting a convention such as majority rule for designating the next or target segment as a function of matching the targets of the branches of the segment currently being executed. In this invention convention is to always take the rightmost branch available. The last aspect of the method is qualifying the execution of the first instruction of the target segment upon the condition, or in the event that it happens to be an inserted ELSE or JOIN.

SISD and SIMD Machines Distinguished

There is no relationship between a SISD machine with contending peripherals and a SIMD machine. Note, a SIMD machine using this invention processes graphs with program segments having cyclic paths therethrough directly. If a SISD machine were to make multiple nested references to peripherals, then arguably the locus of processing would be out at the peripheral, as for example where a SISD references a DASD containing an instruction, which, when interpreted by the SISD processor references DASD again. This more nearly resembles a MIMD machine. An SISD processor with contending peripherals processes only one instruction at a time with the peripheral being managed in the form of queue interrupts. The only correspondence would be that of a SIMD machine processing acyclic (tree) flow graph related segments.

The Embodiment

Figure 1:
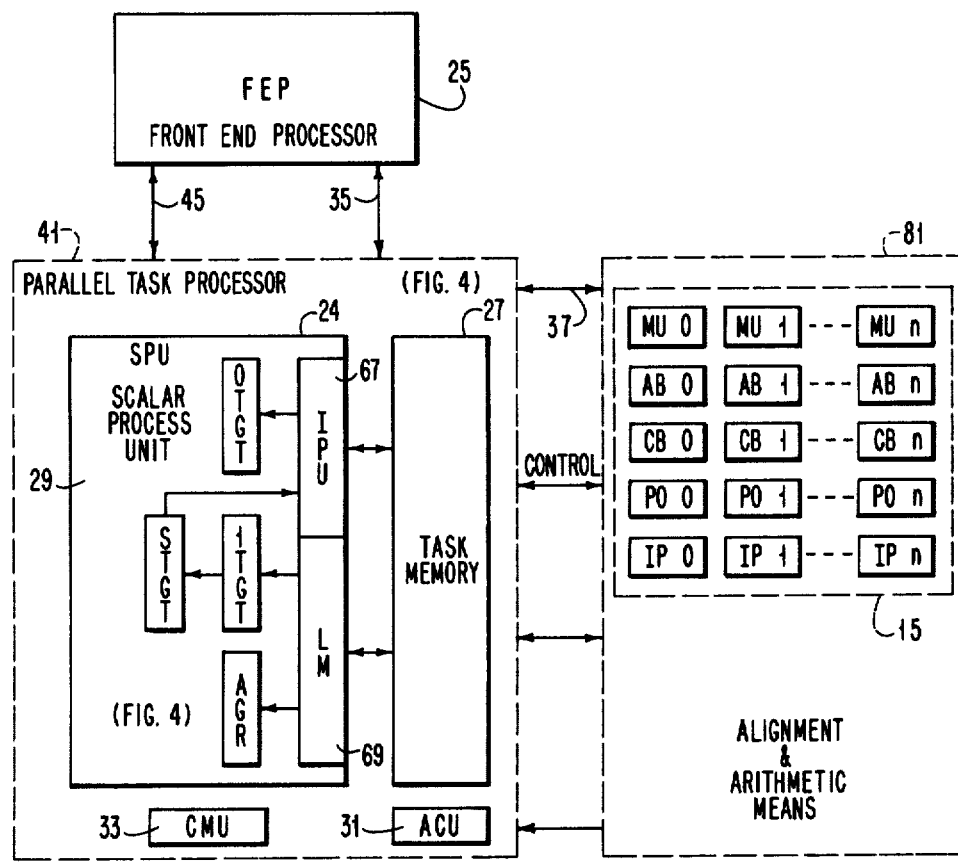

Referring to FIG. 1, there is shown the major elements of an SIMD machine. Front-end processor 25 communicates both program and data elements over paths 45 and 35 to parallel task processor 41. Data and those instructions capable of being executed by an array 81 of n parallel processors are both communicated thereto and controlled by task processor 41 over plural lines 37 and others not identified. Since the invention relates to an improved method and means for conditional branching in an SIMD machine rather than an SIMD architecture per se, the machine description set forth in Stokes et al, U.S. Pat. No. 4,101,960, is hereby incorporated by reference. The focus of subsequent discussion will be on the register plurality and control which, when combined with Stokes' SIMD machine, constitute an apparatus for practicing the method of the invention.

The Stokes machine includes an array of n parallel processors. Each processor in turn has a memory unit MU, a memory interface, and an arithmetic element (both of which are not shown), a bus 37 over which array orders and data are communicated, and a pair of multiplexors, one for serial to parallel conversion and the other parallel to serial reconversion of data from the arithmetic element (not shown) back to the bus and task processor 41.

The invention involves the scheduling and managing of the execution of basic blocks. This is achieved by inserting ELSE/JOIN instructions at the beginning of selected blocks by the compiler as a preprocessing step. Upon execution, such inserted instructions enforce the priority ordering. Status registers have been added to the array, together with comparison circuitry. These include an activity bit AB, priority order PO, conditional bit CB, and instruction pointer IP registers for each of the n processors in the array. In this regard, the "activity mask" is the set of the n activity bit registers. By setting any individual bit, the control unit turns the associated array processor on/off, i.e., active/inactive.

Figure 3:
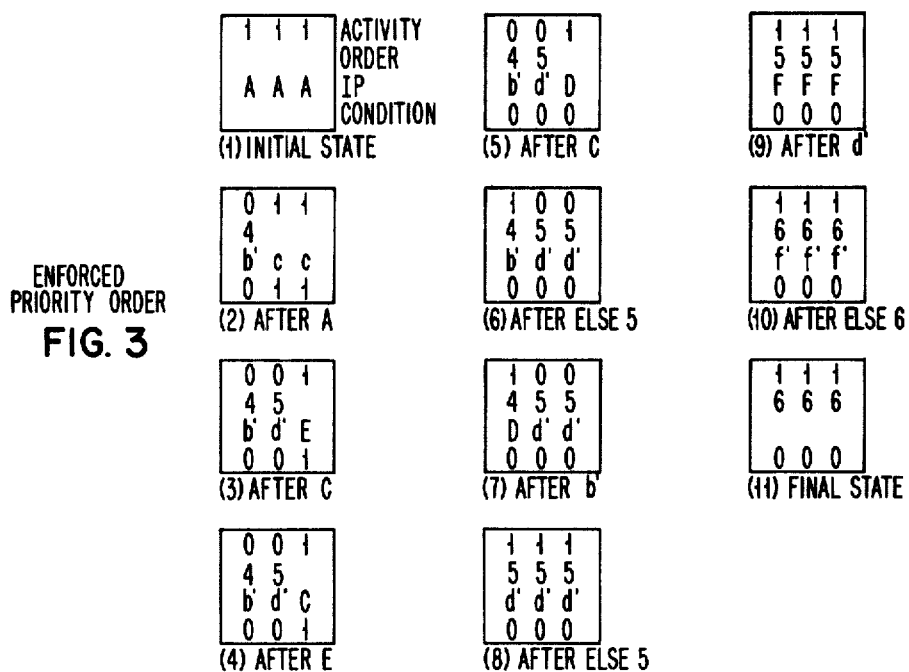
FIG. 3 shows register states at points in the execution of the example program of FIG. 2.

Referring to FIG. 2 when taken together with FIG. 11, there is depicted a plurality of basic blocks in flowgraph relation and possible insertion points at the beginning of each block. The method, as illustrated, inserts only JOIN and ELSE instructions. Alternatively, the instruction "JOIN 4" appearing in block B, may be replaced by the instruction "DATUM 4". This is because the particular JOIN will never be executed, and all that is needed is the order "4" of the block. FIG. 3 illustrates one possible execution sequence for the sample program of FIG. 2.

It is an aspect of this invention that the method includes (1) the new use of ELSE and JOIN instructions for enforcing any given priority ordering and (2) the new use of any priority ordering in executing multiple paths through the program produced by branch-on-condition instructions. Because in FIG. 11, the depicted flowgraph has a large number of possible insertion points, then the issue is to identify a small but sufficient set of insertion points for the ELSE and JOIN instructions in order to enforce a specified order.

If A and B are nodes, then we will use [A, B] to denote the edge from A to B. The interval (A, B) is defined as the set of nodes with order greater than that of A and less than that of B. The edge [A, B] is increasing if the order of A is less than that of B. The edge [A, B] is decreasing if the order of A is greater than that of B. B is referred to as the target of edge [A, B]. An interval is complete, if either no decreasing edge leaves it or all decreasing edges which leave it, leave from the node of maximum order from which no branch returns to the interval. An edge corresponding to the failure or success of a conditional branch likewise corresponds respectively to a left or right branch. An interval (A, B) is protected if it can be entered only by an edge from A.

The preprocessing step, involving selective insertion depicted in FIGS. 2 and 11, is governed by the following criteria:
(1) Insert a JOIN instruction at the beginning of each target of a left branch.
(2) Insert an ELSE instruction at the beginning of the target of any right branch for which the corresponding left branch target has a lower order.
(3) Insert, or replace, a JOIN instruction with an ELSE instruction at the beginning of the target node of each edge [A, B] satisfying the two conditions:
  (a) The interval (A, B) contains a JOIN or an ELSE, and
  (b) Either [A, B] is not a left branch, or (A, B) is incomplete or unprotected.
(4) Repeat step 3 until there is no change.

Referring now to FIG. 3, when taken together with FIG. 2, it should be assumed that the program represented as flowgraph in FIG. 11 has a stipulated priority ordering in which the label for each basic block, such as A, B, is also its symbolic address. A typical priority ordering could be expressed as follows:

| Address | Order |
|---------|-------|
| A | 1 |
| B | 4 |
| C | 2 |
| D | 5 |
| E | 3 |
| F | 6 |

Note that the interval (1, 4) is complete and protected. Interval (2, 5) is incomplete and unprotected, while the interval (3, 6) is complete and unprotected. Thus, one inserts JOIN 4 at b, ELSE 5 at d, and ELSE 6 at f. This is exemplified in FIG. 2.

Suppose there are three processors and the three paths to be taken are as follows:
Path 1: a,b,d,f
Path 2: a,c,d,f
Path 3: a,c,e,c,d,f The states of the registers will be that as shown in FIG. 3.

During the execution of each basic block, condition bits may be set in the counterpart array processor registers. Conditional (or unconditional) branch instructions occur only at the end of a block. Condition bits result from the interaction of program and data and represent a control path selection determined by data.

During the execution of conditional branch instruction (BC), three cases are distinguished:
(1) ALL 0, all condition bits (CB0 to CBn) are 0;
(2) ALL 1, all condition bits are 1;
(3) Mixed, some condition bits are 0, some are 1.

Circuitry for identifying these conditions and enabling respectively (1) step 11, (2) step 12, or (3) step 4, of the instruction execution cycle shown in FIG. 5, are not otherwise illustrated. The ALL 0 case is to be executed as if there were no branch (step 11). The ALL 1 case is to be executed as if there were an unconditional branch (step 12). In the mixed case, processors are treated depending on the value of the counterpart condition bit. Details of the instruction execution cycle per FIG. 5 shall be described subsequently.

The following is a discussion of the execution of conditional branch instructions (BC), JOIN, ELSE, DATUM, as well as instructions including unconditional branch instructions capable of being executed on an unmodified SIMD machine, such as Stokes, U.S. Pat. No. 4,101,960. For purposes of simplification only, two-way branches are described. The extension to multi-way branches is believed to be well within the scope of the skilled artisan when imbued with the teachings of this invention.

If the conditional bit for a processor is 0, then the activity bit associated therewith is turned off, i.e., AB[i] = 0. At the same time, the argument of the first (ELSE/JOIN/DATUM) instruction of the target block for CONDITION=0 is loaded in the PO register. This argument represents the priority order of the next block that the now inactive processor would be awaiting. Concurrently, the IP register is set to address the instruction after the ELSE, JOIN, or DATUM just read.

If the condition bit for a processor is 1, then the activity bit associated therewith is turned on, i.e., AB[i] = 1. At the same time, the argument of the first ELSE/JOIN instruction is of no immediate interest, since the processor is in an active state. The purpose of the PO register contents is to define priority ordering with reference to inactive processors. The IP register is set to the location of the first instruction of the target block.

During the execution of an ELSE instruction, a comparison circuit arrangement indicates where the PO register of an inactive processor (AB=0) points to a block of order lower than the order contained within the PO register of a currently active processor (AB =1). It is necessary to identify which processor PO register contains the minimum (lowest) order for the PO register set, then mask "on" the associated inactive processor and mask "off" the formerly active processors.

Figure 4:
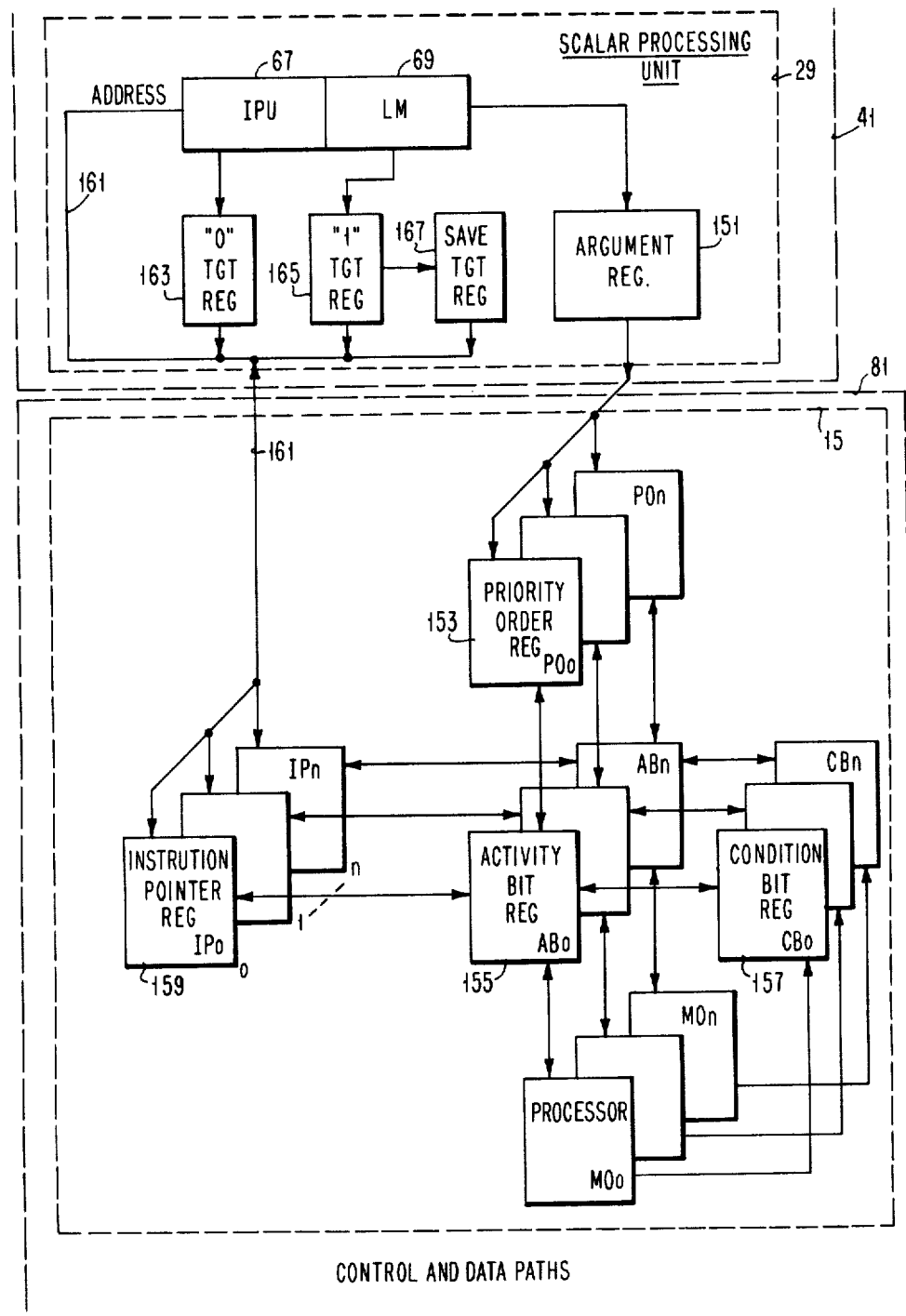
FIG. 4 shows the control and data pathing of the register plurality and controls added to the parallel task processor and array for implementing the method of the invention.

Referring now to FIG. 4, there is shown the control and data pathing of the register plurality and control added to the parallel task processor 41 and array 81 for implementing the method of the invention. Here, argument register 151 interconnects order register plurality 153 to the parallel task processor 41. In turn, the n-priority order registers constituting plurality 153 drive n counterpart activity bit registers 155. These terminate in counterpart ones of n condition CB bit registers 157. The complex of argument, order, activity bit and condition registers defines the processing condition of counterpart ones of the parallel processors in array 81. Instruction pointer registers 159 are coupled to the instruction processing unit 67 and a target register set 163, 165 and 167 over an address bus 161.

The register set 163, 165 and 167 modifies the contents of one or more instruction pointer registers. In this regard, reference should be made to FIG. 5, in steps 3 and 11, the contents of the "0" TGT register are copied into all active instruction pointer registers over bus 161. In step 12, the contents of the "1" TGT register are also copied. In step 13, the contents of the lowest numbered active instruction pointer register are sent over address bus 161 to the IPU as the address of the next instruction to be fetched from the TASK MEMORY 27.

In the modification to Stokes, U.S. Pat. No. 4,101,960, the scaler processing unit 29 must be altered such that specific registers associated with the pair IPU 67 and LM 69 contain the predetermined values after an instruction FETCH from task memory 27. Accordingly, 0 TGT register 165 contains the address in task memory 27 of the instruction stored immediately after the one currently being executed.

1 TGT register 165 contains the address of the instruction to which the control would be transferred if the current instruction were an unconditional branch instruction (or a conditional branch instruction with conditions satisfied).

ARG register 151 contains the value of the first operand of the current instruction. Note, that ARG and 1 TGT may be the same register.

The ELSE instruction which moves control from one basic block to another does this by selectively altering the activity mask. That is, bits in the vector of the activity bit registers are changed. The execution of ELSE results in the change of the current block order to be the minimum of the set of block order registers.

Example of an Instruction Execution Cycle

Referring now to FIG. 3, subfigure 5, there is shown the state of a modified machine just before execution of the ELSE 5 instruction. For purposes of explanation, it is assumed only three processors are present. The following is a step-by-step account corresponding to FIG. 5 of the Execution of the instruction ELSE 5.

In FIG. 5, in step 1, the instruction ELSE 5 is fetched from memory where it resided at address "d". Alternatively, the instruction may have been prefetched or it may reside in a buffer of the IPU. The "0" TGT register receives the address "d'" while the "1" TGT register and the ARG register received the value 5. Refer to FIG. 11 not FIG. 2 for the addresses. Decoding logic, not otherwise illustrated, indicates the following state (1) the instruction is of the ELSE format, and (2) there is no universal agreement. That is, one of the activity registers is 0. Thus, the next step in the execution cycle is step 3. This is followed by steps 10 and 13.

In step 3, the logic described in FIG. 6 allows the IP register IP 3 to receive the value d', while the other IP registers keep their current values IP 1=b', IP 2=d'. Also, the active priority order register PO 3 receives the value 5 from ARG, while the other PO registers remain at PO 1=4, PO 2=5.

At the beginning of step 10, the register states are as follows: AB 1=0, AB 2=0, AB 3=1; PO 1=4, PO 2=5, PO 3=5; IP 1=b', IP 2=d', IP 3=d'; CB 1=0, CB 2=0, and CB 3=0. In step 10, referring to FIG. 7, both lines 193 and 191 are enabled, and PO registers send their values to the generalized comparator 183. Comparator 183 sends a 1 on its corresponding output line for those PO registers with the minimum value. Thus, AB 1 will receive a 1, while AB 2 and AB 3 will each receive 0. This yields the final configuration depicted in FIG. 3, subfigure 6.

In step 13, the switch labeled step 13 in FIG. 8, is set to 1 and AB 1=1, so that the address b' in IP 1 is sent on the address bus 161 to the IPU. This indicates that the next instruction will be fetched memory location b'. This completes the cycle.

Referring now to FIGS. 6, 7 and 8, there is shown apparatus for implementing register modification and status, correlated with instruction execution steps depicted in FIG. 5. In FIG. 6, the register-to-register transfers for steps 3, 11 and 12 are shown. Step 3 contemplates two transfers. The first is from ARG register 151 to ORDER registers 153. The second is from "0" TRG register 163 to IP register 159. In step 11, there is a data movement from register 163 to IP registers 159. In these x-to-y register-to-register transfers the control logic includes a plurality of AND gates 169, 171, 173 activating counterpart y registers through switching elements 175, 177, and 179, if the status of the array processor is active, as registered by a 1 in the counterpart activity bit register at the time the AND gates are enabled by an appropriate clocking signal (not shown on path 181).

Referring now to FIG. 7, there is shown a logic arrangement for implementing steps 9 and 10. Step 9 requires the rewriting of the ACTIVITY bits in register set 155 (A1, A2, An), corresponding to the contents of the order register set 153 made equal to the contents of the ARG register 151. Step 10 requires rewriting the contents of the activity bit registers according to the minimum order register contents. This latter is determined by the comparator arrangements 183 and 201 (1) ... 201(n).

Referring now to FIG. 8, there is shown the logic arrangement for obtaining the next address on bus 161 for an instruction FETCH in parallel task processor 41. The address bus 161 is enabled in steps 5, 8 and 13.

Referring now to FIGS. 9 and 10, there is shown a comparative circuit arrangement for identifying a minimum one of a set of numbers applied to the comparator inputs. Reference should be made to John B. Peatman, "Design of Digital Systems", McGraw-Hill, 1972, at pages 42 and 43. Note in FIGS. 9 and 10 at MCOMP (n) compares n values from the n PO registers and gives one value priority order register length in size output and n single bit outputs. FIGS. 9 and 10 further illustrate (a) the relations among the several MCOMP.

The cycle steps of FIG. 5 may be summarized as:

Step 1. Fetch instruction to IU from MEMORY. Obtain 0 TGT, 1 TGT, and ARG from IPU.
Step 2. Execute standard machine instruction.
Step 3. Update active ORDER registers from ARG. Update active IP registers from 0 TGT.
Step 4. Copy STGT from 1 TGT.
Step 5. Obtain ADDR from 0 TGT.
Stpe 6. Zero inactive CONDITION bit registers. Rewrite ACT bit registers as ACT and not CONDITION so that active registers are the subset of previously active registers corresponding to CONDITION=0.
Step 7. Rewrite ACT as C0NDITION, i.e., copy all CONDITION bit registers into the corresponding ACT bit registers.
Step 8. Obtain ADDR from STGT.
Step 9. Rewrite ACT as ORDER=ARG, activating registers corresponding to ORDER registers with the current order found in ARG.
Step 10. Rewrite ACT as ORDER=min(ORDER), activating exactly those registers corresponding to ORDER registers containing the minimum value currently contained by ORDER registers.
Step 11. Update active IP registers from 0 TGT.
Step 12. Update active IP registers from 1 TGT.
Step 13. Obtain ADDR from the first (or any) active IP register.

There has been disclosed and described a method and means for performing conditional branching in an SIMD machine in which the basic blocks to be executed have first been priority ordered. One method is set forth in which instructions for controlling the ordering are inserted at the beginning of predetermined ones of the basic blocks. Upon the occurrence of a conditional branch instruction and the occurrence of at least one inactive processor pointing to a basic block of order less than the order of the basic block currently being executed, then the processing of the requisite ELSE/JOIN instruction causes the activity mask to be altered, moving control to the basic block of lower order.

It is to be understood that the particular embodiment of the invention described above and shown in the drawing is merely illustrative and not restrictive of the broad invention. It is further expected that ones having ordinary skill in the art, in view of this disclosure, should be able to adapt the principles of this invention to other parallel processors. A useful survey may be found in K.J. Thurber, "Parallel Processor Architectures Part 1: General Purpose Systems, Computer Design", pages 89-97, January 1979, and K.J. Thurber, "Parallel Processor Architectures—Part 2: Special Purpose Systems, Computer Design", pages 103-114, February 1979.

We claim:

1. A two-phase method for controlling the execution of a program consisting of a single entrance, single exit (SESE) program instruction sequences on a single instruction, multiple datastream (SIMD) machine during a second phase, which SESE instruction sequences were previously conditioned from an ordinary program instruction sequence on a single instruction, single datastream (SISD) machine during a first phase, said SIMD machine includes an array of parallel processors; means for applying independent datastreams to counterpart processors, each processor having an activity mask (active, inactive); and a control unit for applying the program to the processors to interact with the data and for regulating the activity state of each processor by altering its activity mask contents, wherein:

during the first phase, the steps of:
 (a) compiling an ordinary program and decomposing it into SESE instruction sequences, the last instruction in each sequence being either an unconditional or conditional branch;
 (b) priority ordering the sequences according to a depth ordering convention and assigning sequence label numbers thereto linearly; and
 (c) inserting either a ELSE or JOIN instruction at the beginning of sequences selected according to a first predetermined convention; and during the second phase, the steps of:
 (d) causing a SESE sequence processed during the first phase to be executed on one or more processors of an SIMD machine in parallel; and causing the designation of the next executable SESE sequence as a function of the matching or mismatching of the SESE sequence targets of the branches of the sequence currently being executed on one or more processors according to a second predetermined convention;
 (e) upon occurrence of a branch instruction, ascertaining the targets and, if there does not exist a target to a successful conditional branch, transferring control to the unique target, otherwise transferring control to the target of the successful conditional branch and masking off as inactive the processors corresponding to the target of the unsuccessful conditional branch;
 (f) upon the occurrence of an ELSE instruction in said current SESE sequence as applied to the SIMD machine, ascertaining the next SESE target sequence having the lowest priority order number; masking on into an active state each inactive processor awaiting execution of the ascertained target SESE sequence; and masking off into an inactive state all other processors waiting to execute other SESE sequences; or
 (g) upon the occurrence of a JOIN instruction in said current SESE sequence as applied to the SIMD machine, masking on into an active state those inactive processors waiting to execute SESE sequences having a priority order number the same as that of the SESE sequence currently being executed by the SIMD machine.

2. A method according to claim 1, wherein step (c) includes the steps of:
inserting a JOIN instruction at the beginning of each target SESE sequence of a left branch; and
inserting an ELSE instruction at the beginning of each target of an SESE sequence of a right branch for which the corresponding left branch SESE sequence has a lower priority order number.

3. A method according to claim 1, wherein the priority order number is the argument of a DATUM instruction.

* * * * *